United States Patent [19]

Tada

[11] Patent Number: 4,866,534
[45] Date of Patent: Sep. 12, 1989

[54] IMAGE PROCESSING APPARATUS
[75] Inventor: Kaoru Tada, Osaka, Japan
[73] Assignee: Minolta Camera Kabushiki Kaisha, Osaka, Japan
[21] Appl. No.: 169,303
[22] Filed: Mar. 17, 1988
[30] Foreign Application Priority Data Mar. 17, 1987 [JP] Japan .................................. 62-64982

[51] Int. Cl.$^4$ ............................................ H04N 1/40
[52] U.S. Cl. ..................................... 358/456; 382/42; 364/518
[58] Field of Search ................. 358/280, 283; 382/42; 364/518, 602, 604

[56] References Cited

U.S. PATENT DOCUMENTS 4,651,243  3/1987  Kato .................................... 358/283

FOREIGN PATENT DOCUMENTS 58-44861   3/1983  Japan .
58-136173  8/1983  Japan .
58-137362  8/1983  Japan .
58-153455  9/1983  Japan .
58-75372  11/1983  Japan .
58-205376 11/1983  Japan .

OTHER PUBLICATIONS

Fumitaka One, "Dither Method", J. Institute of Image Electronics Engineers of Japan 40, 388–397, 1980 (partial trans.)

Primary Examiner—Edward L. Coles, Sr.
Attorney, Agent, or Firm—Price, Gess & Ubell

[57] ABSTRACT

An image processing apparatus for transforming electic data of a half-tone image into a bi-level image by using a dither matrix, having a plurality of dither matrices of different patterns to each other, the dither matrices being chosen to remove textures due to dither processing, wherein the average of electric image data of a block of the size of the dither matrices is calculated, and a dither matrix is selected according to the average.

6 Claims, 5 Drawing Sheets (a) dither matrix in case of input density < 50%

```
     18  4 14 32 60 49 58 40
      6  0  2 12 30 62 42 20
M1   22  8 10 28 54 37 56 44
     46 24 26 50 39 17 35 52
     61 48 59 41 19  5 15 33
     31 63 43 21  7  1  3 13
M2   55 36 57 45 23  9 11 29
     38 16 34 53 47 25 27 51
```

(b) dither matrix in case of input density ≥ 50%

```
 2 15  4 22 44 58 48 30
32  0 20 42 56 62 60 50
 8 27  6 18 40 54 52 34
25 47 29 10 16 38 36 12
45 59 49 31  3 14  5 23
57 63 61 51 33  1 21 43
41 55 53 35  9 26  7 19
17 39 37 13 24 46 28 11
```

Fig. 4
49%
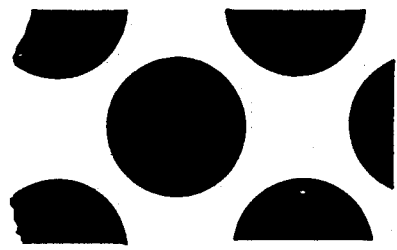
⇕ change at 50%
51%
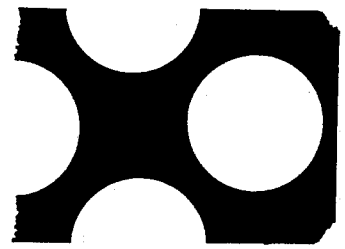
Fig. 5(a) 40%
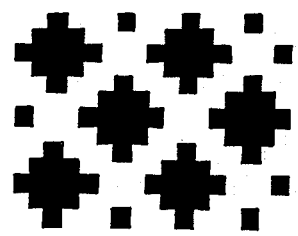
Fig. 5(b) 49% ↓
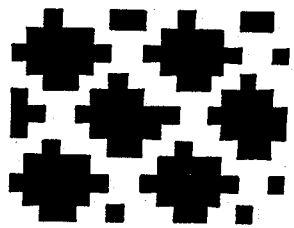
Fig. 5(c) 50% ↓
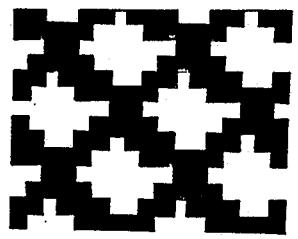
Fig. 5(d) 60% ↓
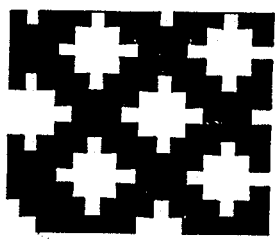

0.25mm in case of 200dpi

IMAGE PROCESSING APPARATUS

BACKGROUND OF THE INVENTION

1. Field of the Invention

The present invention relates to an image processing apparatus for transforming a half-tone image into a bi-level image by using a dither matrix.

2. Description of the Prior Art

A half-tone image can be binarized with use of a proper dither matrix to form a bi-level image, and the gradation thereof can be expressed with use of an area gradation processing. It is known that a high quality bi-level image can be obtained by using a dither matrix which is similar to dot printing employed widely in the printing technology. However, a false texture is liable to disproportionately emphasized in a bi-level image produced by dither processing.

A checkered pattern is an example of such texture. For example, FIG. 8 shows examples of dots at various densities in dot printing. A checkered pattern may appear at a density of 50%. In case of the dither processing, white portions and black ones may form a checkered pattern if the resolution of dots is low and the input density level or an output area ratio is 50%, as shown in FIG. 9. A checkered pattern may attract unwanted viewer attention and thereby detracts from the half tone image.

On the other hand, if a dot is deformed to avoid a checkered pattern, the shape of each dot becomes quite different from a circle and therefore, the gradation at a portion having a high or low density level is spoiled remarkably. Various kinds of image processing methods have been proposed in order to remove false gradation textures. For example, in Japanese patent laid-open publications JP-A No. 58-44861, No. 58-153455 and No. 58-205376, a difference between the maximum value and the minimum one of the density level is calculated in a block which consists of a plurality of pixels, and a dither matrix to be used is selected among a plurality of dither matrices according to the difference while all outputs are made white if the average density of the block is smaller than a predetermined value. According to a method disclosed in Japanese patent laid-open publication JP-A No. 58-136173, a plurality of dither matrices of various patterns are prepared and a dither matrix which makes a ratio of the low frequency components smallest is selected among them. In a facsimile disclosed in Japanese patent laid-open publication JP-A No. 58-137362, a dither matrix suitable for giving a high resolution of image and another matrix suitable for shortening a transmission time are provided and an operater selects either one of them by changing the mode. Further, according to a method disclosed in Japanese patent laid-open publication JP-A No. 58-75372, a dither matrix of divergence type is adopted so that black dots are concentrated by overlapping them to eradicate white dots.

SUMMARY OF THE INVENTION

It is an object of the present invention to provide an image processing apparatus which is able to give natural gradation with use of plural dither matrices.

Another object of the present invention is to provide an image processing apparatus capable of avoiding a false checkered pattern effectively upon binarizing image data.

A further object of the present invention is to provide an image processing apparatus capable of selecting a suitable dither matrix according to an average density of an image to be processed.

An image processing apparatus according to the present invention for transforming electric data of a halftone image into a bi-level image by using a dither matrix, comprises: memory means for storing electric data of an image of at least a block of picture elements corresponding to the size of the dither matrix; selection means for reading electric data of a block of the size of the dither matrix, for calculating the average of the electric data of the block and for comparing the average with a predetermined threshold value to send a selection signal to designate a dither matrix according to the average; generation means, having a plurality of dither matrices of different patterns to each other, for sending a threshold value at an address of a dither matrix selected by the selection signal received from the selection means, the dither matrices being chosen to remove textures due to dither processing; and binarizing means for comparing an electric data in the block at an address corresponding to the address of the dither matrix, received from the memory means, with the threshold value received from the generation means.

Thus, two or more of dither matrices having respective threshold value patterns different from each other are provided beforehand, and dither processing is performed by automatically selecting a dither matrix among them according to an average density obtained from a matrix of picture elements to be processed.

It is an advantage of the present invention to provide an image processing apparatus wherein a false checkered pattern at the input density of about 50% becomes imperceptible as a texture.

BRIEF DESCRIPTION OF THE DRAWINGS

Further objects and advantages of the present invention will be apparent from the following description, reference had to the accompanying drawings wherein:

FIGS. 3(a) and 3(b) show examples of dither matrices employed according to the present invention;

FIG. 4 is a diagram which shows an example of change in image at 50% of the average input density;

FIGS. 5(a), 5(b), 5(c) and 5(d) are diagrams which show an example of change in image with increase in the average input density successively;

DETAILED DESCRIPTION OF THE PREFERRED EMBODIMENTS

Embodiments of this invention will be explained below with reference to the accompanying drawings.

Figure 1:
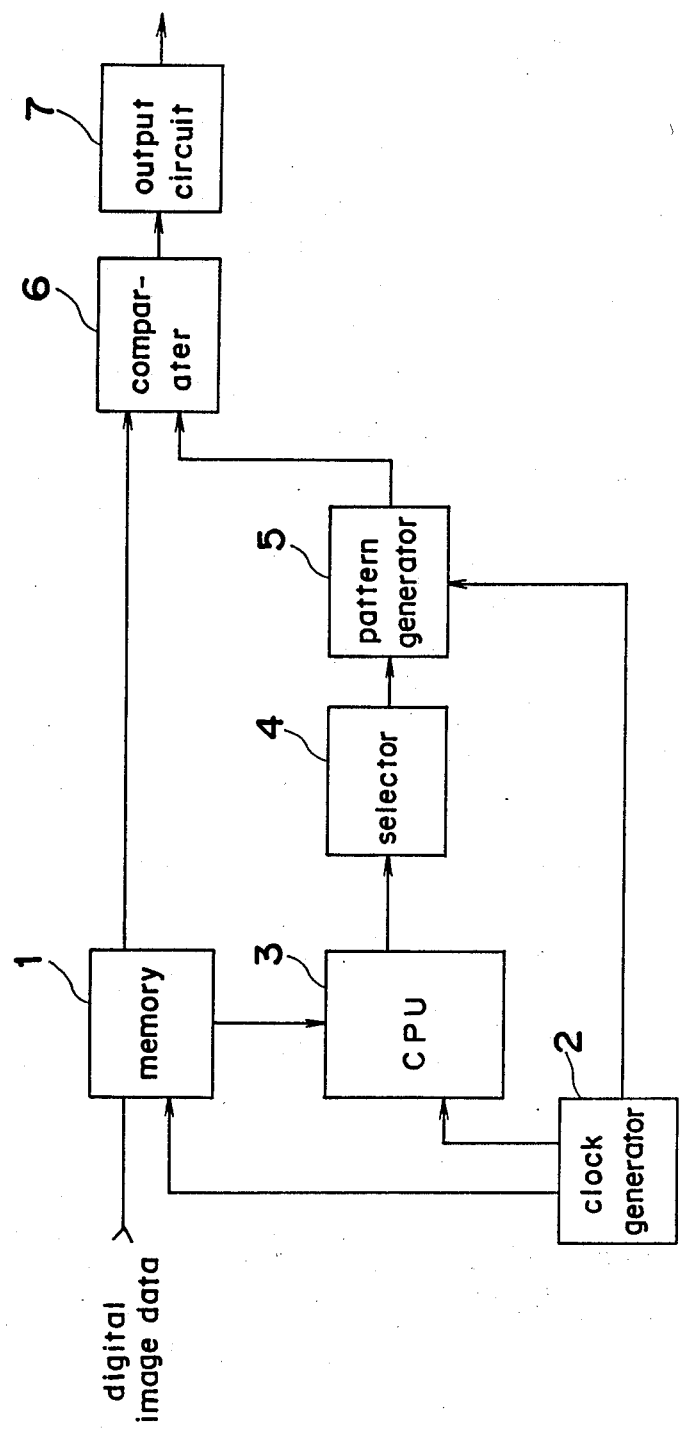
FIG. 1 is a block diagram of an image processing apparatus according to the present invention.

FIG. 1 shows a block diagram of an image processing apparatus, wherein a memory 1 stores electric digital image data (density) sent from a scanner as serial data or parallel data. An image data has been quantized in sixty four levels. The memory 1 needs a capacity capable of storing at least m lines of data in the case that an (n×m) dither matrix is used for dither processing wherein n designates the number of picture elements in the direction of a line, or the memory 1 may have a capacity being able to store all image data to be displayed on a scope of an external display unit.

A clock generator 2 generates clock signals for synchronizing the memory 1, CPU 3 and a pattern generator 5.

CPU 3 reads image data of an (n×m) matrix of picture elements from the memory 1, calculates an average density of the image data contained in the matrix and sends the result to a selector 4.

The selector 4 selects a dither matrix among a plurality of dither matrices by comparing the average density with a density threshold value, as will be explained below, and sends a signal (address) of the selected dither matrix to the pattern generator 5.

The pattern generator 5 sends a data of the dither matrix stored at the address designated by the selector 4 to a comparater 6 in synchronization with data sent from the memory 1.

The comparator 6 compares bit by bit the image data received from the memory 1 with the data in the dither matrix received from the pattern generator 5, and sends the resultant image data in unit of one bit to an output circuit 7, which sends every 1-bit image data to an external unit such as a printer or a display unit.

Figures 2, 3:
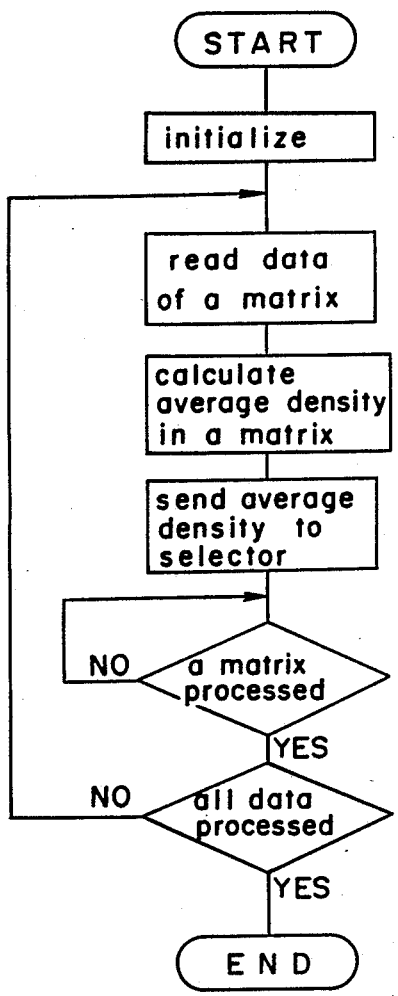
FIG. 2 is a flowchart of the image processing according to the present invention.

FIG. 2 shows a flowchart of dither processing by CPU 1. After initializing the dither processing (step P1), CPU 1 makes the memory 1 store electric digital image data of density sent from an external scanner. Next, CPU 1 reads image data of (n×m) matrix of dots, which has the same dimension as the dither matrices used, from the memory 1 (step P2), and calculates an average density in the matrix (step P3). Then, the calculated average density is sent to the selector 4 (step P4). After receiving the average density, the dither processing is performed as mentioned above by the hardware of the selector 4, the pattern generator 5 and the comparator 6. In this processing, the selector 4 compares the average density with a predetermined density threshold value (50% in this embodiment) and selects either one of the two dither matrices according to the result obtained by the comparison. In this embodiments, two (8×8) matrices shown in FIGS. 3(a) and 3(b) are provided. Thus, the comparator 6 performs binarization of image data by using one of the two dither matrices selected according to the average density.

This dither processing is performed successively with respect to individual elements in the (n×m) matrix of image data (step P5). If it is decided that all elements in the matrix are processed completely (YES at step P5), the program returns to step P2, and a next matrix of image data is processed. If all image data stored in the memory 1 is processed (YES at step P6), this flow is completed.

In this embodiment, the threshold value for the average density of an image data matrix is set at 50% in the selector 4 in order to avoid a checkered pattern, and (8×8) dither matrices shown in FIGS. 3(a) and 3(b) are selected according to whether the average density is less than 50% or not. The dither matrix shown in FIG. 3(a) which is selected when the average density is smaller than 50% is a convergence type (a swirl type) wherein black dots are likely to converge at low densities, while that shown in FIG. 3(b) which is selected when the average density is equal to or larger than 50% is a divergence type wherein black dots are likely to scatter in the background. It should be noted that the dither matrix shown in FIG. 3(a) has a substantially reversed relation with the other matrix shown in FIG. 3(b). That is, the matrix shown in FIG. 3(a) can be transformed into that shown in FIG. 3(b) by converting the density levels 0, 1, 2, ..., 63 in the matrix shown in FIG. 3(a) to 63, 62, 61, ..., 0 measured from the black level 63 and next by replacing a lower part M1 with an upper part M2. The new levels express levels for white dots in the black background. In other words, the dither matrix shown in FIG. 3(b) is also a convergence type as far as white dots are concerned. Thus, the scattering of black dots at low densities for which the dither matrix shown in FIG. 3(a) is used is similar to that of white dots at high densities for which the other shown in FIG. 3(b) is used.

The first dither matrix to be selected at a low average density is determined so as to give an independent pattern made of black dots on a white background, as shown in the upper portion of FIG. 4 schematically, and the second one to be selected at a high average density is determined so as to give an independent pattern of white dots on a black background, as shown in the lower portion of FIG. 4 schematically. Thus, independent black or white patterns are formed in a white or black background while the background in a matrix is connected to the counterparts in adjacent matrices. A pair of such matrices can give natural gradation at respective density levels because it is natural for eyes to view a pattern in the background. Dither matrices shown in FIGS. 3(a) and 3(b) are an example of such a pair to give natural gradation and to remove false textures.

FIGS. 5(a), 5(b), 5(c) and 5(d) show changes of patterns obtained when image data are processed by using either of dither matrices shown in FIGS. 3(a) and 3(b) selected by comparing the average density with the threshold value 50% while changing the density from 40% to 49%, from 49% to 50% and from 50% to 60%, respectively. As is apparent form FIGS. 5(a) to 5(d), no checkered pattern is perceptible as a texture even if the density is changed so as to cross the boundary of 50%. If a texture other than a checkered pattern is to be avoided, a threshold value other than 50% may be adopted.

Figure 6:
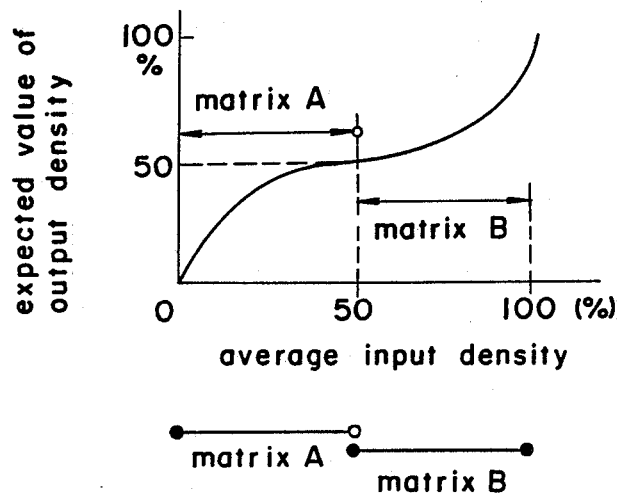
FIG. 6 is a graph of the expected value of output density plotted against the average input density in case of using two dither matrices A and B.

FIG. 6 shows a relation between the expected output density and the average input density in a matrix in this case. The reason why such a nonlinear relation is obtained is that the area of a picture element is larger than that of a dot.

However, it is desirable to obtain a linear relation between the white and black levels in order to obtain natural gradation.

Figure 7:
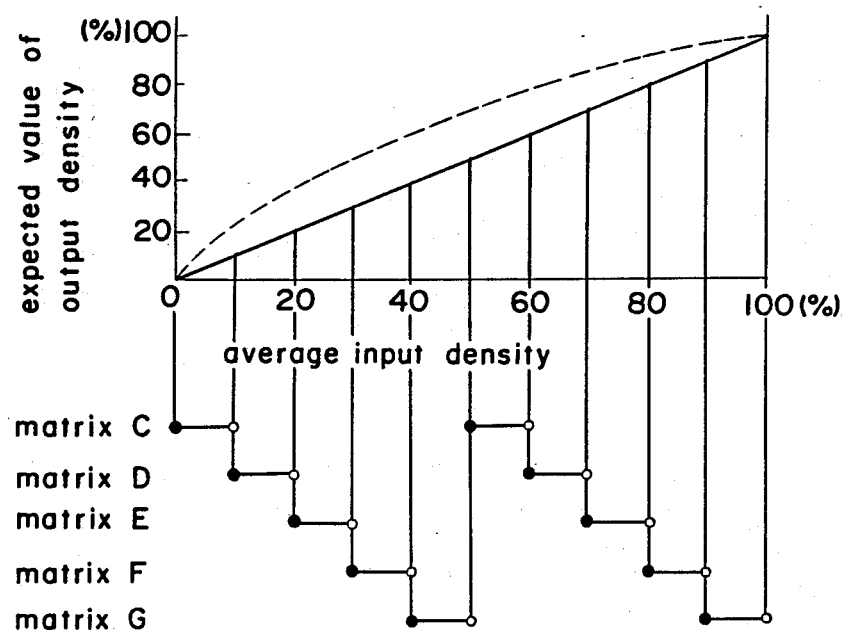
FIG. 7 is a graph of the expected value of output density plotted against the average input density in case of using five dither matrices C-G.
Figure 8:
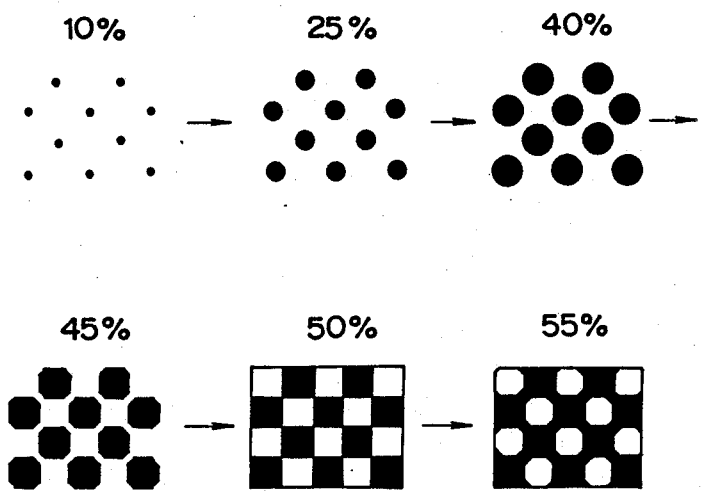
FIG. 8 is a diagram which shows dots with increasing density in dot printing successively.
Figure 9:
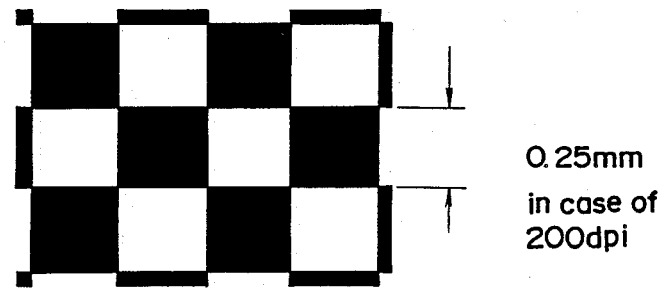
FIG. 9 is a diagram of a checkered pattern.

FIG. 7 shows schematically a manner for realizing a linear relation. In this example, five dither matrices C, D, E, F and G are provided for giving a linear relation between two densities in respective range defined by dividing the average input density into ten. Among five matrices, the dither matrix C gives respective linear relations in two ranges defined between 0% and 10% and between 50% and 60%. Similarly, each of the other dither matrices D, E, F and G give respective linear relations in corresponding two ranges, as shown in FIG. 7. These five dither matrices C, D, E, F and G are used selectively in every range defined by every ten %.

Thus, an image having natural gradation and an output density proportional to an input density can be obtained.

This invention may be embodied in still other ways without departing from the spirit of essential characters thereof. The preferred embodiments described herein are therefore illustrative and not restrictive, the scope of the invention being indicated by the appended claims and all variations which come within the meaning of the claims are intended to be embraced herein.

What is claimed is:

1. An image processing apparatus for transforming electric data of a half-tone image into a bi-level image by using a dither matrix of a predetermined size, comprising:

memory means for storing density data of an image of at least a block of picture elements corresponding to the size of the dither matrix;

selection means for reading density data of a block of the size of the dither matrix, for calculating the average of the density data of the block and for comparing the average with a predetermined threshold value to send a selection signal to designate a dither matrix according to the comparison of the average;

generation means, having a plurality of dither matrices of different patterns relative to each other, for sending a threshold value at an address of a dither matrix selected by the selection signal received from the selection means, the dither matrices being chosen for respective blocks to remove textures due to dither processing; and binarizing means for comparing density data in the block which is at an address corresponding to the address of the dither matrix, with the threshold value received from the generation means, said data received from the memory means.

2. An image processing apparatus according to claim 1, wherein the generation means has a dither pattern of a convergence type and the other of a divergence type for white data in a bi-level image and the selection means has a predetermined threshold value of 50% and selects the former matrix when the average is less than 50% while selecting the latter matrix otherwise.

3. An image processing apparatus according to claim 1, wherein the generation means has a dither matrix pattern of convergence type and a dither matrix pattern of divergencew type having a substantially reversed relation to the dither matrix pattern of convergence type with respect to the density and the selection means has a predetermined threshold value of 50% and selects the convergence type matrix when the average is less than 50% while the divergence type matrix is selected otherwise.

4. An image processing apparatus according to claim 1, wherein the generation means has a plurality of dither matrices each suitable for a different range of electric data to each other for obtaining a linear relation between the average input density and the output density.

5. An image processing apparatus for transforming the data indicative of a half tone image into a bi-level image, comprising:

a plurality of dither matrices, each matrix defined by a specific predetermined pattern which is different relative to the others, each dither matrix having a pattern of convergence and divergence type;

means for storing data of an image, said means storing the data in blocks representative of a size of a dither matrix;

means for calculating an average of the data in a block and for comparing the average with a predetermined threshold value to send a selection signal to designate a dither matrix according to the average;

means for comparing the data in each block with a threshold value received from its designated dither matrix, and means for selecting a dither matrix with a convergence type when the average is less than 50%, while selecting a dither matrix with a divergence type pattern otherwise.

6. An image processing apparatus for transforming data of a half-tone image into a bi-level image by using a dither matrix of a predetermined size, comprising:

memory means for storing data of an image of at least a block of picture elements corresponding to the size of the dither matrix;

selection means for reading data of the block, for calculating the average of the data of the block and for comparing the average with a predetermined threshold value of 50% to send a selection signal to designate a specific dither matrix;

generation means, having a plurality of dither matrices of different patterns relative to each other, the dither matrices being chosen for respective blocks to remove textures due to dither processing, including a dither matrix pattern of a convergence type and another of a divergence type for white data in a bi-level image, the selection means sending a selection signal to the generation means to select the convergence matrix at a lower value than 50% while selecting the divergence matrix at a higher value than 50%, and binarizing means for comparing data, received from the memory means, in the block which is at an address corresponding to the address of the dither matrix, with the threshold value, whereby an output image signal will be enabled.

* * * * *